United States Patent [19]

Komoto

[11] Patent Number: 4,487,279
[45] Date of Patent: Dec. 11, 1984

[54] ELECTRONIC BALANCE

[75] Inventor: Akira Komoto, Otsu, Japan

[73] Assignee: Shimadzu Corporation, Kyoto, Japan

[21] Appl. No.: 409,423

[22] Filed: Aug. 19, 1982

[30] Foreign Application Priority Data

Aug. 21, 1981 [JP] Japan .................. 56-131711

[51] Int. Cl.$^3$ .................. G01G 7/00; G01G 3/14
[52] U.S. Cl. .................. 177/212; 177/210 EM
[58] Field of Search .................. 177/212, 210 EM

[56] References Cited

U.S. PATENT DOCUMENTS

| 3,799,281 | 3/1974 | Wernitz | 177/212 X |
| 4,245,711 | 1/1981 | Kunz | 177/212 |
| 4,373,596 | 2/1983 | Kunz | 177/212 |
| 4,417,632 | 11/1983 | Lohberg | 177/212 |

Primary Examiner—George H. Miller, Jr.
Attorney, Agent, or Firm—Koda and Androlia

[57] ABSTRACT

An electronic balance whose force equilibrating unit consists of a coarse balancing system and a fine balancing system to obtain a precise value of weight measurement in a short time.

8 Claims, 15 Drawing Figures

ELECTRONIC BALANCE

BACKGROUND OF THE INVENTION

1. Field of the Invention

The present invention relates to an electronic balance, and more particularly to an electronic balance utilizing as a balancing force an electromagnetic force which is automatically controlled so as to be balanced against a weight to be measured.

2. Prior Art

In general, known electronic balances have a force equilibrating unit comprising an electromagnetic coil and a magnetic circuit to provide a static magnetic field, the electromagnetic coil being mechanically connected with a weight-receiving tray and supported movably in a vertical direction in said static magnetic field. The electromagnetic coil, supplied with an electric current, produces an electromagnetic force to oppose a weight placed on the weight-receiving tray. The weight value is given by the current which makes the electromagnetic force just balanced against the weight to be measured.

In relation to this type of balances the present patent applicant has already filed an electronic balance in which the electromagnetic coil is supplied with an "alternating" pulse current, namely, a pulse current whose pulse polarity is alternating. The frequency of the pulse is chosen sufficiently high so that the balance may be prevented from possible mechanical vibrations. The electromagnetic force opposing the weight is regulated by automatically controlling the duty factor of the pulse current, with the amplitude and frequency kept constant. The average current, which determines the electromagnetic force, depends on the duty factor of the pulse. The use of an "alternating" pulse current is to keep the Joule heat generation by the coil always constant irrespective of the average value of the pulse current. There are also disclosed some other kinds of electronic balance in which a "non-alternating" pulse current is used. In any way, the most important problem involved in an electronic balance in which a pulse current is used is to measure the duty factor of the pulse so precisely as to comply with a resolving power required for the balance. The duty factor of a pulse current is, in general, measured with a clock signal whose frequency is sufficiently higher than that of the pulse. In principle, therefore, the resolving power can be increased to any degree by increasing the frequency of the clock. In practice, however, there are some technological and economic difficulties and disadvantages in increasing the clock frequency on a large scale. In case of a balance using a 1 kHz-pulse current a 1 MHz-clock gives a resolving power of the order of only $10^{-3}$. If, as is often the case with a precision balance, a resolving power of the order of $10^{-6}$ is needed, a 1 GHz-clock must be used. The use of such a high frequency clock in a balance is apparently unpractical in both technological and economic aspects. Although there have been proposed, of course, some contrivances for measuring the duty factor, they also have many disadvantages, particularly in relation to the requirements for the measuring speed and precision.

SUMMARY OF THE INVENTION

The present invention aims at solving the above mentioned problems involved in measuring the duty factor of the pulse current flowing through the electromagnetically weight-balancing coil, and it is an object of the present invention to provide an improved electronic balance which gives a precise value of measurement without incorporating such a very high frequency clock as is mentioned above.

Another object of the invention is to enable such an improved electronic balance to give a precise value of measurement in a short time.

A further object of the invention is to enable such an improved electronic balance to be manufactured in a simple construction and at low cost.

Other objects and advantages of the present invention will become apparent from the detailed description of the invention given hereinafter in conjunction with the embodiments and appended drawings.

To accomplish the above mentioned objects the electronic balance based on the present invention is, in brief, provided with two weight-balancing systems: a coarse balancing system and a fine balancing system. The coarse balancing system comprises an electromagnetic coil whose attainable maximum force reaches the maximum scalable weight of the balance, a pulse current supplyer to the coil, and a pulse current duty factor controller which coarsely regulates the duty factor of the pulse according to a relatively rough digital signal. The value of the digital signal changes in accordance with a predetermined program until the tray loaded with a weight to be measured is brought to a coarsely balanced position within a predetermined range. The fine balancing system also contains an electromagnetic coil, which gives the tray a fine balancing in accordance with an output from a tray displacement detector provided to detect the displacement of the tray. The current flowing through this coil is digitalized, and then added to said digital signal concerned with the duty factor regulation in the coarse balancing system, to give the precise result of weight measurement.

DETAILED DESCRIPTION OF THE INVENTION

Figure 1:
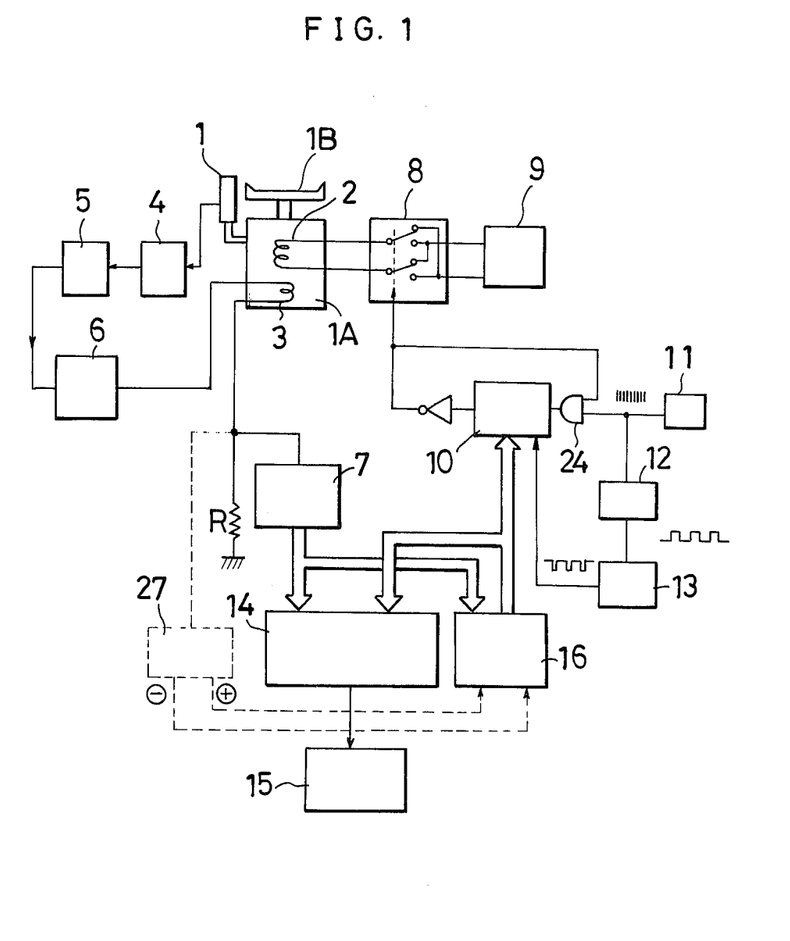
FIG. 1 shows a block diagram of a first embodiment of the invention.

Referring to FIG. 1 which shows a block diagram of a first embodiment of the present invention, a force equilibrating unit 1A contains two electromagnetic coils 2 and 3, and a tray displacement detector 1 shown in the vicinity of a weight receiving tray 1B. The unit 1A is devised so that a weight loaded to the tray 1B may be balanced coarsely in the first place by the force produced by the coil 2 and then balanced precisely by that produced by the coil 3. The coils 2 and 3, wound on the same bobbin and mechanically connected with the tray, are designed to be movable freely in a vertical direction in a static magnetic field provided by a permanent magnet assembly (not shown in the figure). The electromagnetic coil 2, a change-over switch 8, a constant-current supply 9 and a presettable up-and-down counter 10 constitute a coarse balancing system. The current outputted from the constant-current supply 9 is converted to an "alternating" pulse current by the change-over swtich 8 which is driven by the digital output from the presettable up-and-down counter 10. The coil 2 is thus supplied with an alternating pulse current. In the figure the change-over switch 8 is illustrated only schematically, but it is really made up of any of known electronic change-over switching circuits. On the other hand the displacement detector 1, a displacement signal amplifier 4, a PID controller 5, a power amplifier 6, the electromagnetic coil 3 and a resistor R constitute a fine balancing system. The coarse balancing system covers the whole weighing range of the balance coarsely, whereas the fine balancing system covers only a limited range but precisely.

On receiving on the tray 1B a weight to be measured the tray displacement detector 1 outputs a tray displacement signal to the PID controller 5 through the displacement signal amplifier 4. This signal causes the PID controller 5 to develop a current in the system to make the coil 3 produce a force opposing the weight. If the weight is small so as to be overcome by a current within the maximum value that the PID controller 5 can control, the balance comes to be precisely balanced only by the fine balancing system. The resistor R develops a voltage which corresponds to the balancing current flowing through the coil 3. This voltage is converted to a digital signal by an A-D converter 7, and then outputted therefrom toward a weight value indicator 15 through an adder 14 without any value added to the digital signal in the present case. In case the weight overwhelms the control capacity of the PID controller 5, a saturation signal is inputted to a memory 16 from the A-D converter 7. On receiving the saturation signal the memory 16 outputs a presetting signal to the presettable up-and-down counter 10 in accordance with a predetermined program stored in the memory 16. With the presetting signal inputted the counter 10 starts counting the clock signal sent from a clock 11, and outputs a first switching signal when it completes counting the clock signal up to the number determined by the presetting signal. The counter 10 is further devised also to output a second switching signal when reset by the reset signal from a monostable multivibrator 13, which is driven at a frequency made reduced from that of the clock 11 through a frequency divider 12. The change-over switch 8, driven by these first and second switching signals, alternates the direction of the current to be supplied to the coil 2, so that the coil 2 is supplied with an alternating pulse current. The frequency of the pulse, determined by the reset signal, is equal to the frequency of the monostable multivibrator 13, while the duty factor is determined by the counted number of the clock pulses. The presetting signal to determine the number of the clock pulses to be counted is successively renewed in accordance with the program prepared in the memory 16 until the duty factor comes to make the average of the pulse current give the coil 2 a force balancing with the weight. Once the coarse balancing is thus attained positioning the weight-receiving tray 1B at a coarsely balanced point, the PID controller 5 becomes free from saturation, and the fine balancing system again starts functioning. Then the coil 3 is controlled finely and the tray 1B is positioned at a precisely balanced point. At the adder 14 the output from the A-D converter 7 is added to the presetting signal outputted from the memory 16. The output of the adder 14 is displayed at a displayer 15 as a precisely measured weight value.

Figure 9:
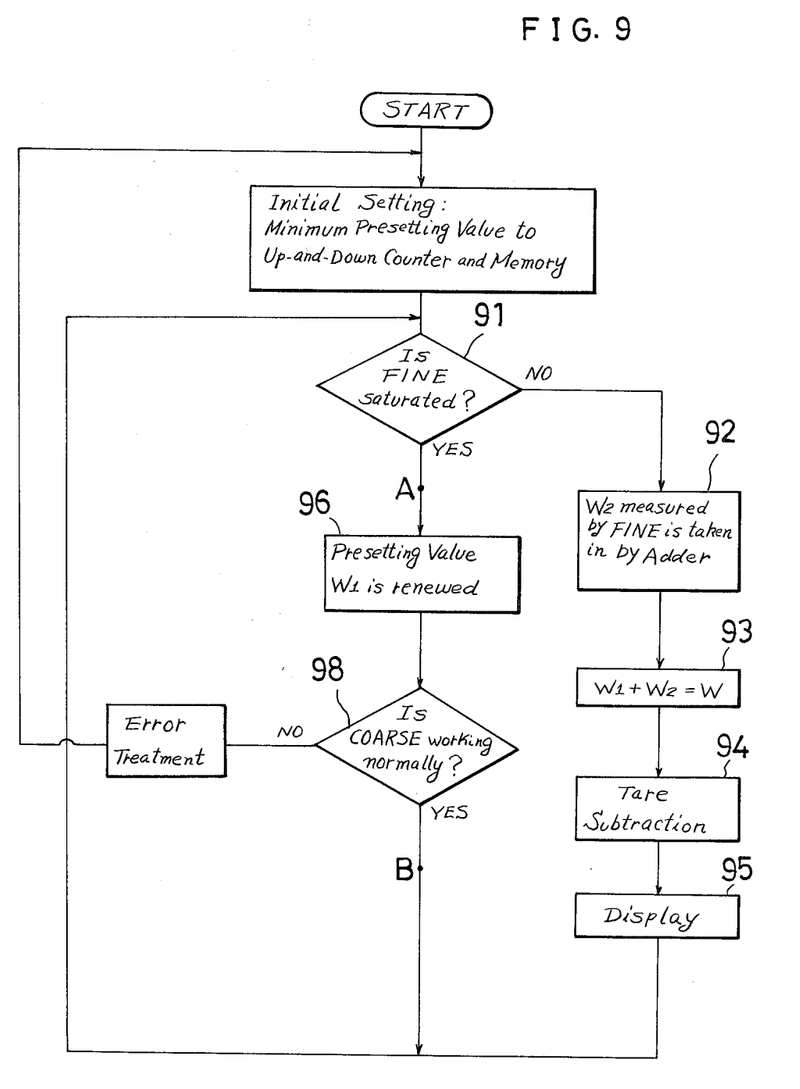
FIG. 9 is a flow chart illustrating the function of the embodiment shown in FIG. 1.

FIG. 9 shows a flow chart explaining the performance of the abovedescribed first embodiment. It is judged at Step 91 if the fine balancing system is saturated. If the system is judged not to be saturated, at Step 92 the adder 14 takes in a fine balancing value $W_2$ obtained by the fine balancing system, namely the output from the A-D converter 7. Step 92 is followed by Step 93 at which the adder 14 adds the value $W_2$ to a value $W_1$ given by the coarse balancing system, namely the presetting signal sent from the memory 16. A tare is subtracted from the sum $W = W_1 + W_2$ at Step 94, and then a final measured weight is displayed at the displayer 15 (Step 95). On the other hand, if at Step 91 the fine balancing system is judged to be saturated, the presetting signal is renewed at Step 96 according to the program. At Step 98 it is judged if the coarse balancing system normally produces a balancing force. If the system is judged working normally, Step 98 is followed again by Step 91. This process is repeated until Step 91 judges the fine balancing system made free from saturation.

In the process described above there are considered four kinds of process of renewing the presetting signal. Theses are explained by the partial flow charts shown in FIGS. 10, 11, 12 and 13. The partial flow charts correspond to a part defined between the points A and B in FIG. 9.

Figure 10:
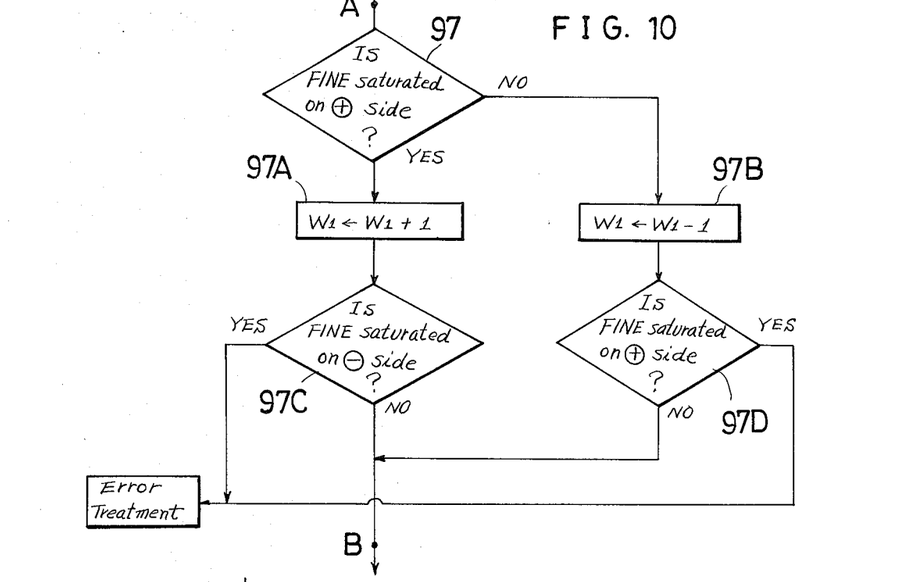
FIGS. 10, 11, 12 and 13 are flow charts illustrating different ways of determining the presetting signal in the embodiment shown in FIG. 1.

FIG. 10 shows the first way of renewing the presetting signal. If the fine balancing system is judged to be saturated on the positive side, the presetting signal $W_1$ is replaced by $W_1 + 1$ (Step 97A). If the system is saturated in the negative side the presetting signal $W_1$ is replaced by $W_1 - 1$ (Step 97B). In each case it is judged at Step 97C or 97D if the renewed value makes the coarse balancing system produce a force less than the maximum controlling force of the fine balancing system. The process is repeated until Step 91 (FIG. 10) judges the fine balancing system made free from saturation.

Figure 11:
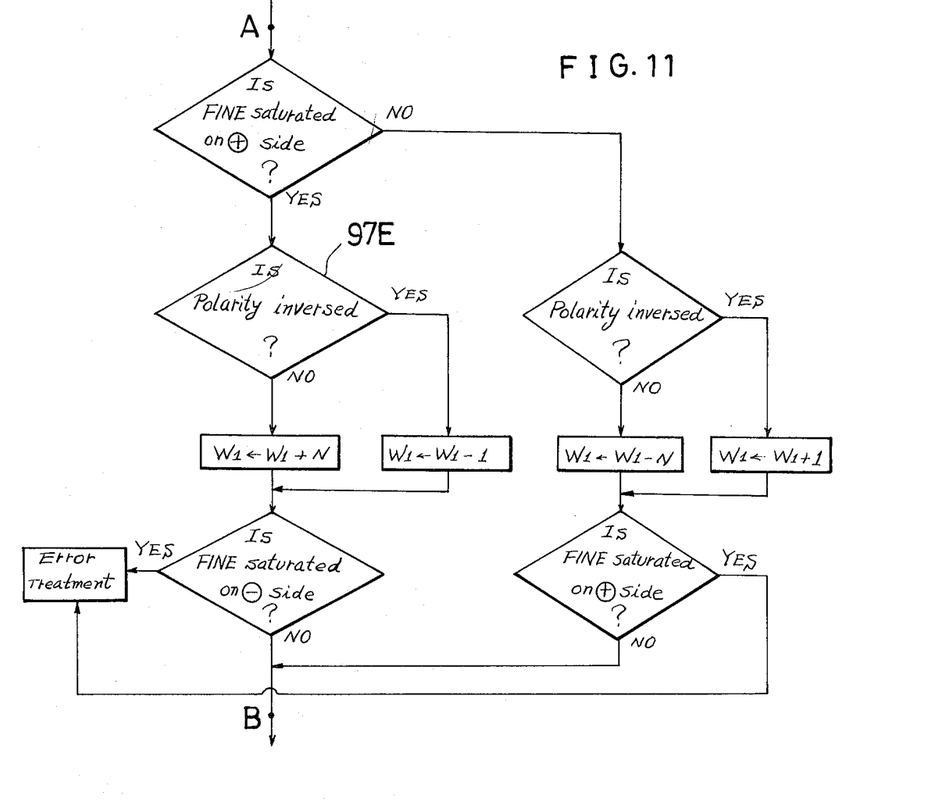

FIG. 11 shows the second way of renewing the presetting signal. If the fine balancing system is judged to be saturated on either the positive side or the negative side, the presetting signal $W_1$ is replaced by $W_1 + N$ or $W_1 - N$, respectively, where N is a predetermined integer larger than unity. In repetition of the process if the saturation polarity of the fine balancing system changes to the opposite (negative or positive respectively) sign, a value of unity is, respectively, subtracted from or added to the presetting signal.

Figure 12:
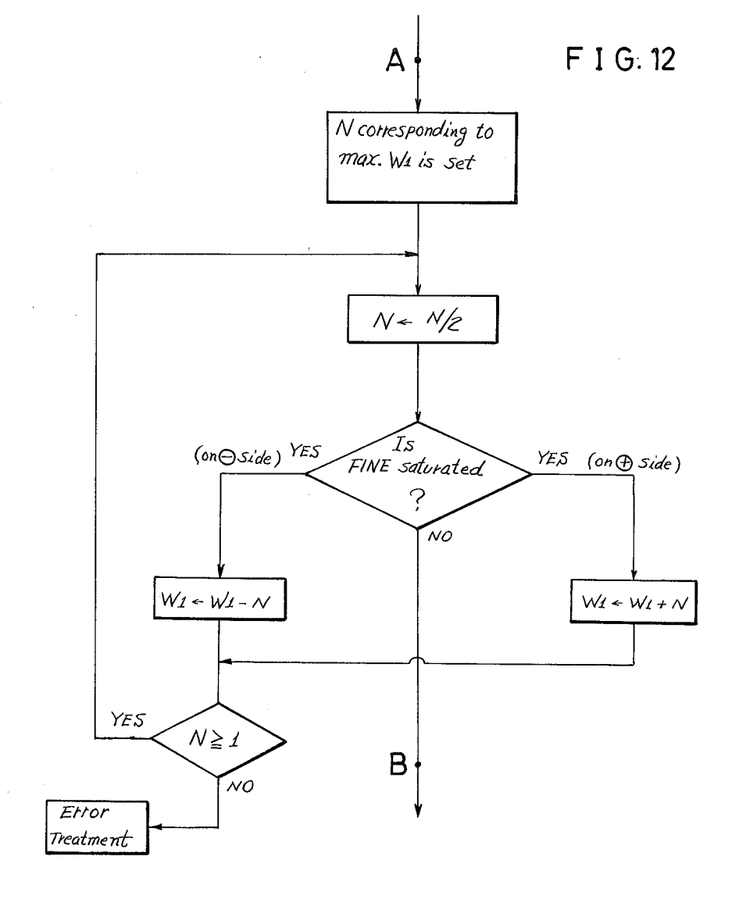

FIG. 12 shows the third way of renewing the presetting signal. An integer N to be added to or subtracted from the presetting value $W_1$ is initially predetermined at a value equal to the decimal number corresponding to the number of bits of the presettable counter 10.

In the repetional process of renewing the presetting signal, the integer N is successively reduced by half until the fine balancing system is judged saturated either on the positive side or the nagative side. This way enables the whole balancing system to be settled in the shortest time.

Figure 13:
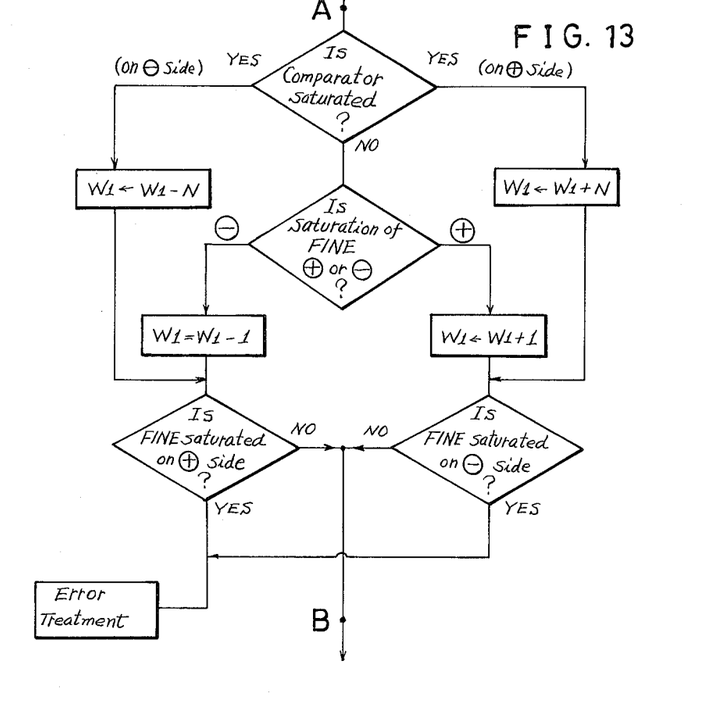

FIG. 13 shows the fourth way of renewing the presetting signal. In this example, a comparator 27 shown with a dotted line in FIG. 1 also is put into action. As is shown by the flow chart, the presetting signal is increased or decreased by N pulses when not only the fine balancing system but also the comparator 27 is saturated, and increased or decreased by one pulse when only the fine balancing system is saturated. In this case a set level of the comparator 27 is made larger than N times the saturation input of the fine balancing system so that, when the comparator 27 comes to output a non-saturated signal, the fine balancing system still remains saturated. Therefore, the presetting signal changes toward a final value with the changing direction kept unchanged.

Figure 2:
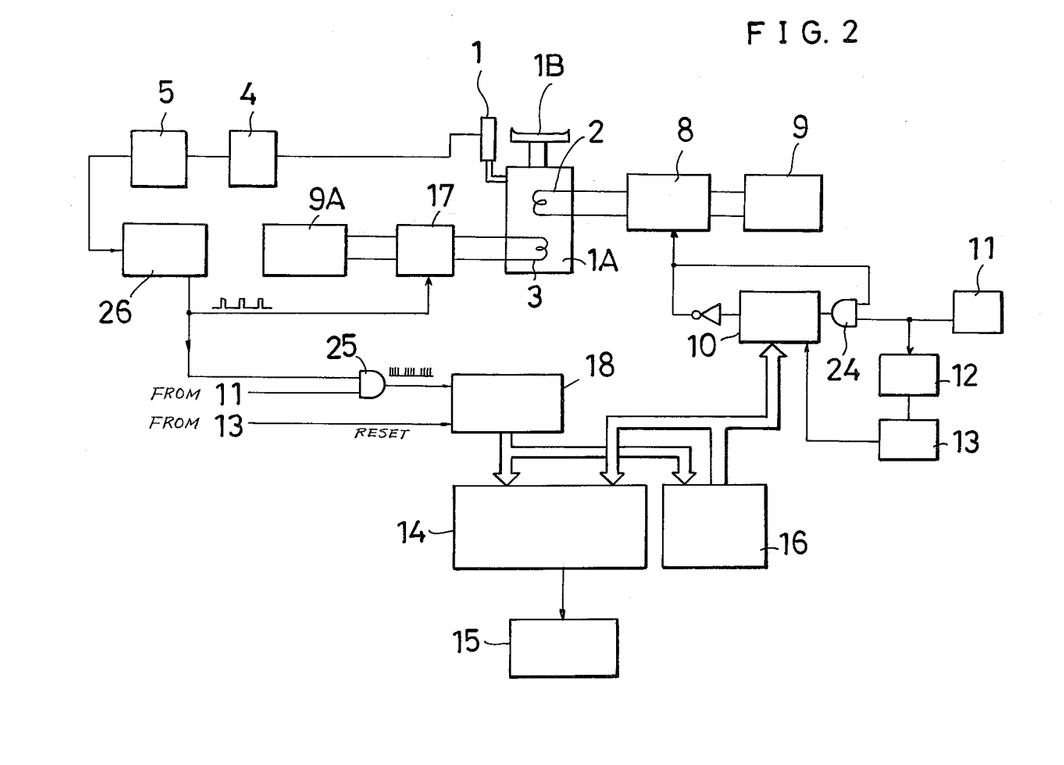
FIG. 2 shows a block diagram of a second embodiment of the invention.
Figures 3, 5:
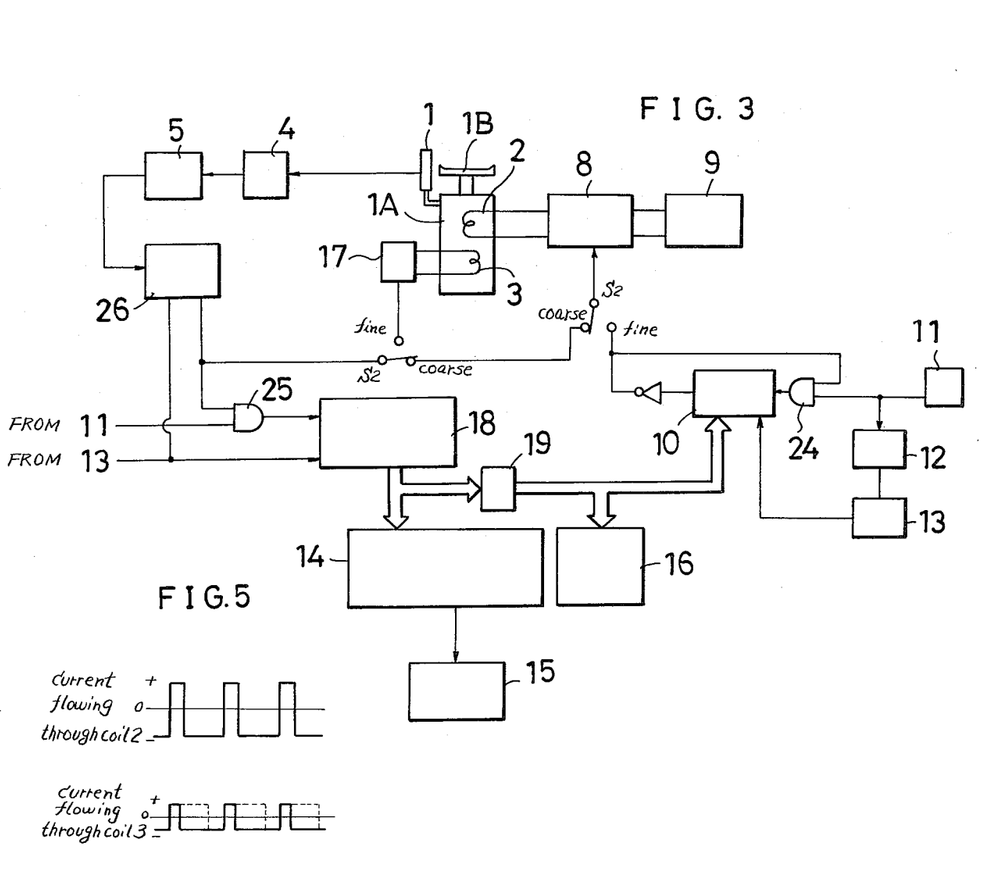
Fig. 3 shows a block diagram of a third embodiment of the invention.
FIG. 5 shows the currents flowing through the electromagnetic coils in the embodiments shown in FIGS. 2 and 3.
Figure 4:
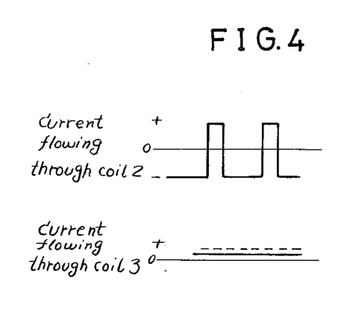
FIG. 4 shows the currents flowing through the electromagnetic coils in the embodiment shown in FIG. 1.

A second embodiment of the invention is shown in FIG. 2. In this embodiment the fine balancing system comprises a tray displacement detector 1, a displacement signal amplifier 4, a PID controller 5, a voltage-pulse width converter 26, a constant-current supply 9A, a switching circuit 7 and an electromagnetic coil 3. In such a construction of the fine balancing system, the coil 3 also is supplied with a pulse current through the switching circuit 17 which, driven by the pulse from the voltage-pulse width converter 26, outputs a pulse current whose average value is controlled by the PID controller 5. The output of the fine balancing system is inputted to the same adder 14 as is used in FIG. 1 through an AND gate 25 and a counter 18. FIG. 5 shows the currents flowing through the coil 3 and the coil 2 in the coarse balancing system.

Figure 15:
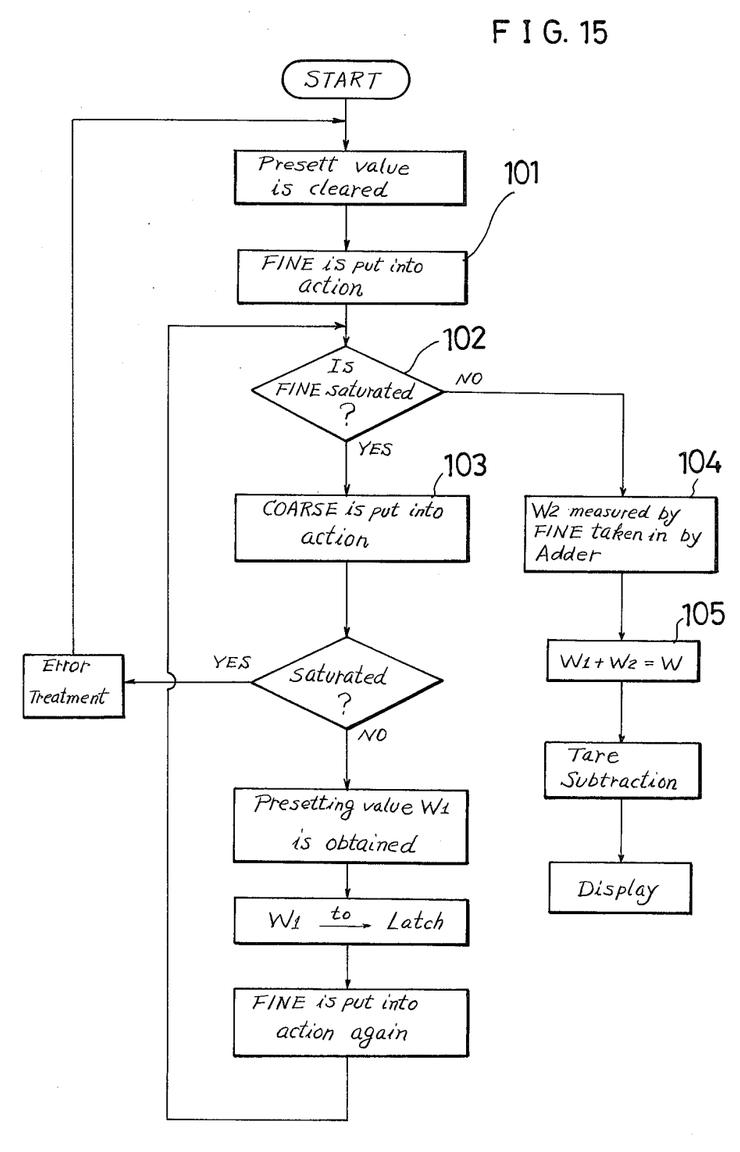
FIG. 15 is a flow chart illustrating the function of the embodiment shown in FIG. 3.

A third embodiment of the invention is shown in FIG. 3. This embodiment has a distinct feature in determining the presetting signal through a coarsely balancing action of the balance. Switches $S_1$ and $S_2$ change the balance either to a coarse balancing action or to the fine balancing action. With the switches $S_1$ and $S_2$ turned to COARSE the coarse balancing system in this embodiment is constituted with an electromagnetic coil 2, a change-over switch 8, a constant-current supply 9, a tray displacement detector 1, a displacement signal amplifier 4, a PID controller 5, a voltage-pulse width converter 26, an AND gate 25 and a counter 18. A coarsely measured weight value is memoried in a latch 19. The fine balancing system of this embodiment (with the switches $S_1$ and $S_2$ turned to FINE) is the same as the constitution of said second embodiment shown in FIG. 2. FIG. 15 shows a program stored in the memory 16 of this embodiment. After an initial condition being set, the fine balancing system is put into action in the first place at Step 101. If at Step 102 a measured value $W_2$ is judged to be within the maximum controllable range of the system, this value alone gives a final measured weight at Step 104. If at Step 102 the measured value $W_2$ is judged overflowing the maximum controllable range, Step 102 is followed by Step 103 at which the coarse balancing system is put into action. A measured value $W_1$ is memoried in the latch 19, and the weighing process returns to Step 102, at which it is judged if the value measured by the fine balancing system comes into the maximum controllable range of it. If the value is within the range, this value $W_2$ is added to the value $W_1$ to give a total measured weight $W = W_2 + W_1$ (Step 105). The wave form of the current through the finely balancing coil 3 is the same as that shown in FIG. 5.

Figure 6:
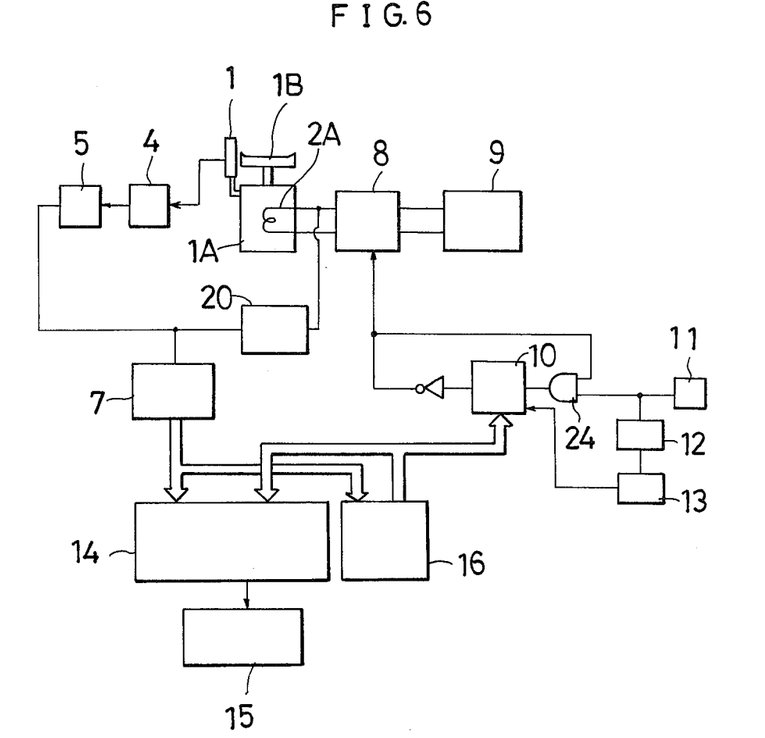
FIG. 6 shows a block diagram of a fourth embodiment of the invention.
Figures 7, 8:
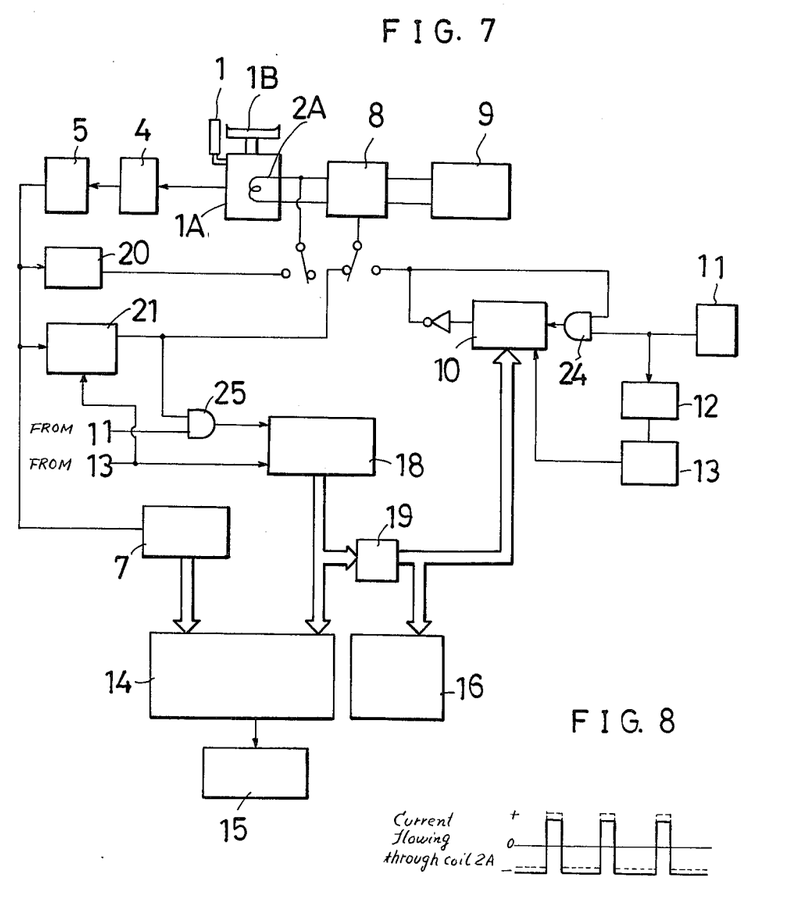
FIG. 7 shows a block diagram of a fifth embodiment of the invention.
FIG. 8 shows the current in the electromagnetic coil in the embodiments shown in FIGS. 6 and 7.

A fourth embodiment of the invention is shown in FIG. 6. This embodiment has one electromagnetic coil 2A, which is commonly used for both the fine balancing system and the coarse balancing system. The coil 2A being commonly used this embodiment comprises a voltage-current converter 20. FIG. 8 shows a current flowing through the coil 2A, in which the dotted line means an current increase within the maximum controllable range of the fine balancing system.

A fifth embodiment of the invention is shown in FIG. 7. This embodiment is constructed by combining said third embodiment shown in FIG. 3 with said fourth embodiment shown in FIG. 6. With switches $S_1$ and $S_2$ turned to COARSE the coarse balancing system is put into action, and with them turned to FINE the fine balancing system is put into action.

Further, all the embodiments described above can be modified by using a non-alternating pulse current in the coarse balancing system. In this case it is necessary to provide any suitable countermeasure to overcome the Joule heat variations which arise in the electromagnetic coil depending on the weight value to be measured.

Figure 14:
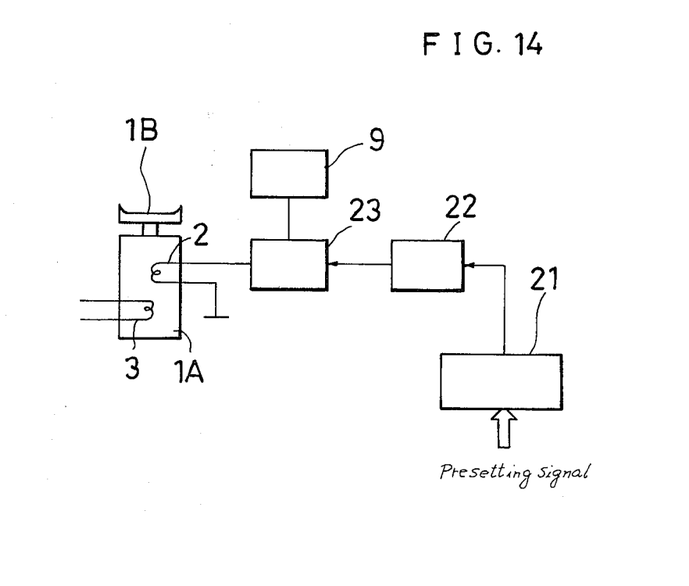
FIG. 14 shows a partial block diagram of a further modified embodiment of the invention.

Finally, a further embodiment is described, in which the pulse current in the coarse balancing system is controlled not by the duty factor but by the frequency with the amplitude and duty factor kept constant. In this case the presetting signal, which determine the frequency of the pulse and not the duty factor, has discrete values, for example, with an interval of 1 Hz in a range between 1 kHz and 3 kHz. The electromagnetic coil, supplied with such a pulse current, produces the electromagnetic force corresponding to the presetting signal, as is the case with the embodiment in which the duty factor is controlled. FIG. 14 shows a partial construction of the frequency controlling part. A frequency synthesizer 21 is constructed with a PPL (phase locked loop), and produces a frequency corresponding to the presetting signal. A monostable multivibrator 22 produces a pulse signal with a constant width in response to the frequency. According to the pulse an electronic switch 23 changes the current supplied by a constant-current supply 9 to a pulse current.

The present invention, as is made clear, dissolves many disadvantages and difficulties involved in the prior art of improving a resolving power and measuring speed of electronic balances in which a pulse current is used to produce a balancing force. It should be, therefore, understood that there may be some other changes and modifications which a person skilled in the art can make within the spirit of the present invention, since the explanation described above in conjunction with the embodiments are only by means of examples.

What is claimed is:

1. An electronic balance comprising:
    a force equilibrating unit which electromagnetically compensates a weight to be measured, consisting of a weight receiving tray, a displacement detector for detecting the displacement of said weight receiving tray, a magnetic circuit to provide a static magnetic field, and a force coil assembly mechanically connected with said weight receiving tray and movably located in said static magnetic field, said force coil assembly being made up of a first coil and a second coil:

a first current-supplying means for supplying to said first coil a pulsed first current whose duty factor is controlled by a first digital value to be predetermined;

a second current-supplying means for supplying to said second coil a second current which corresponds to the output of said displacement detector;

a digital value determining means for determining said first digital value when the output of said displacement detector reaches a predetermined upper or lower limit;

a digital value generator for generating a second digital value which corresponds to the average value of said second current; and an arithmetic unit which derives a weight value by adding said second digital value to said first digital value.

2. An electronic balance comprising:

a force equilibrating unit which electromagnetically compensates a weight to be measured, consisting of a weight receiving tray, a displacement detector for detecting the displacement of said weight receiving tray, a magnetic circuit to provide a static magnetic field, and a force coil mechanically connected with said weight receiving tray and movably located in said static magnetic field;

a first current-supplying means for supplying to said force coil a pulsed first current whose duty factor is controlled by a first digital value to be predetermined;

a second current-supplying means for supplying to said force coil a second current with the same superposed on said pulsed first current, said second current corresponding to the output of said displacement detector;

a digital value determining means for determining said first digital value when the output of said displacement detector reaches a predetermined upper or lower limit;

a digital value generator for generating a second digital value which corresponds to the average value of said second current; and an arithmetic unit which derives a weight value by adding said second digital value to said first digital value.

3. An electronic balance defined in claim 1 or 2, wherein the polarity of said pulsed first current is alternating;

4. An electronic balance defined in claim 1 or 2, wherein the polarity of said pulsed first current is not alternating;

5. An electronic balance defined in claim 1 or 2, wherein said digital value determining means is constructed so as to be operated manually.

6. An electronic balance defined in claim 1 or 2, wherein said digital value determining means is constructed so as to function in accordance with a predetermined program.

7. An electronic balance comprising:

a force equilibrating unit which electromagnetically compensates a weight to be measured, consisting of a weight receiving tray, a displacement detector for detecting the displacement of said weight receiving tray, a magnetic circuit to provide a static magnetic field, and a force coil assembly mechanically connected with said weight receiving tray and movably located in said static magnetic field, said force coil assembly being made up of a first coil and a second coil;

a first pulse generating means for generating a pulse signal whose duty factor corresponds to the output of said displacement detector;

a first current supplying means for supplying to said first coil a pulsed first current whose duty factor is controlled by a duty factor control pulse inputted thereto;

a second current supplying means for supplying to said second coil a second current whose value is controlled so as to correspond to the output of said displacement detector by a second-coil control pulse inputted thereto;

a memory for storing a digital signal which corresponds to the duty factor of the output of said first pulse generating means;

a second pulse generating means for generating said second coil control pulse whose duty factor corresponds to the output of said displacement detector;

a first switching means for selecting, as said duty factor control pulse, either the output of said first pulse generating means or the output of said second pulse generating means; and a second switching means for enabling, as said second-coil control pulse, the output of said first pulse generating means to be inputted to said second current supplying means;

8. An electronic balance comprising:

a force equilibrating unit which electromagnetically compensates a weight to be measured, consisting of a weight receiving tray, a displacement detector for detecting the displacement of said weight receiving tray, a magnetic circuit to provide a static magnetic field, and a force coil mechanically connected with said weight receiving tray and movably located in said static magnetic field;

a first pulse generating means for generating a pulse signal whose duty factor corresponds to the output of said displacement detector;

a first current supplying means for supplying to said force coil a pulsed first current whose duty factor is controlled by a duty factor control pulse inputted thereto;

a second current supplying means for supplying to said force coil a second current with the same superposed on said pulsed first current, said second current being controlled in accordance with the output of said displacement detector;

a memory for storing a digital signal which corresponds to the duty factor of the output of said first pulse generating means;

a second pulse generating means for generating a second pulse whose duty factor corresponds to the output of said displacement detector;

a first switching means for selecting, as said duty factor control pulse, either the output of said first pulse generating means or the output of said second pulse generating means; and a second switching means for enabling the output of said second current supplying means to be connected to said force coil.

* * * * *